J. GARAMI.
COIN CHANGING AND DELIVERING MACHINE.
APPLICATION FILED MAY 22, 1918.
1,350,148.
Patented Aug. 17, 1920.
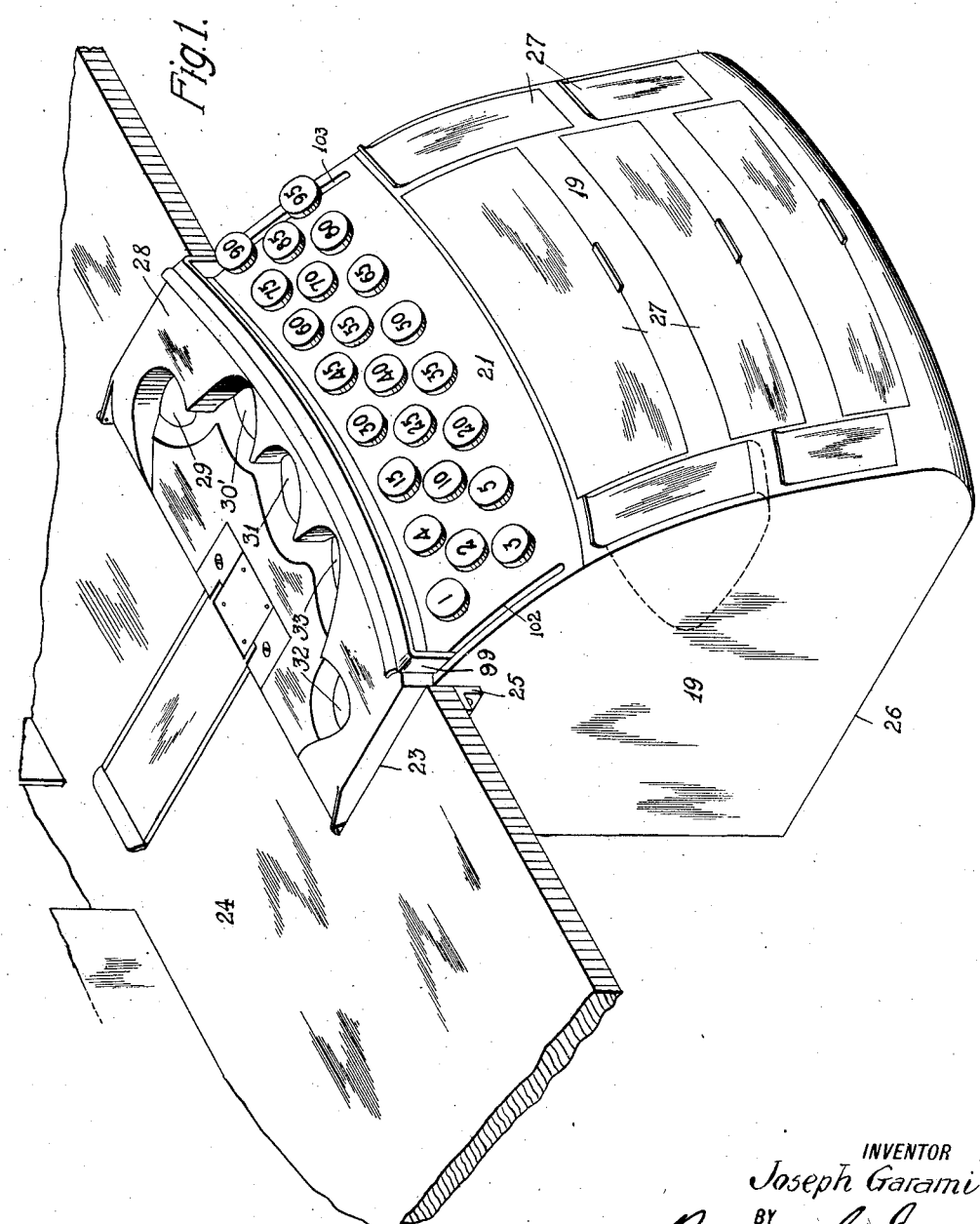
INVENTOR
Joseph Garami
BY
His ATTORNEY.

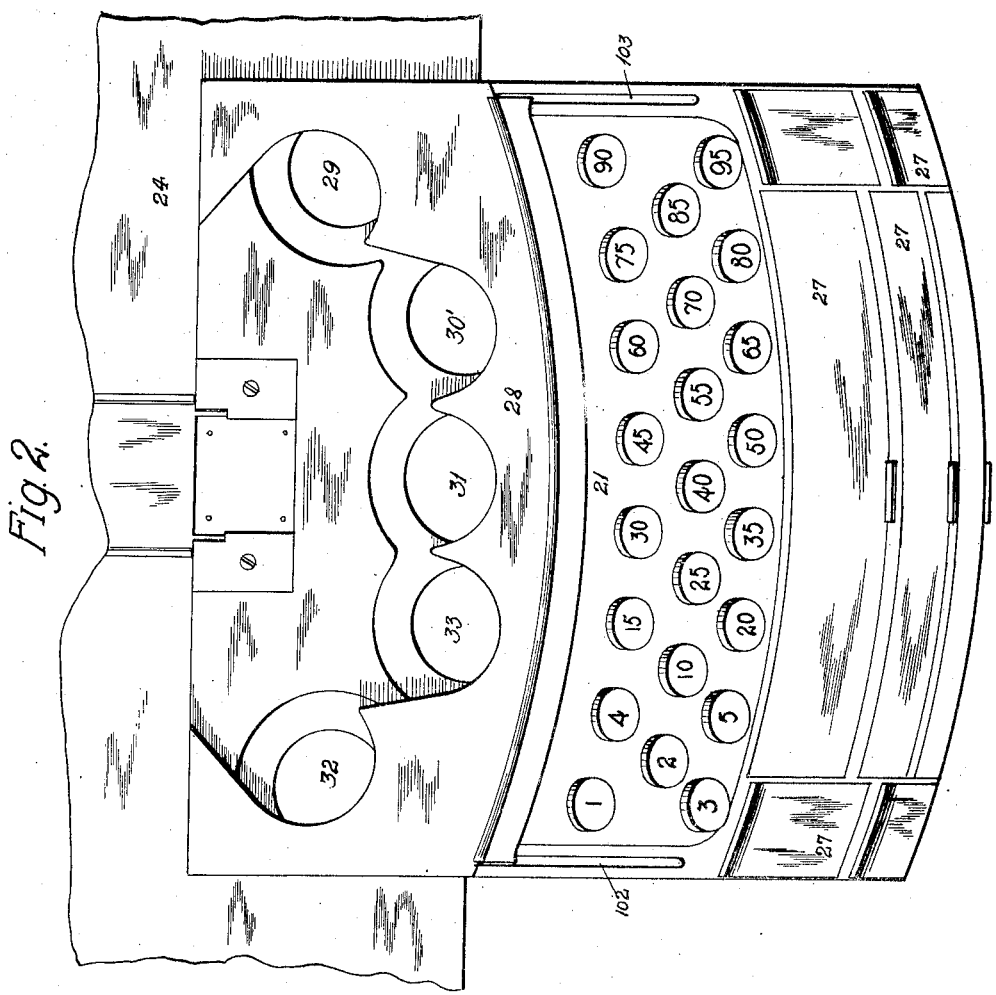

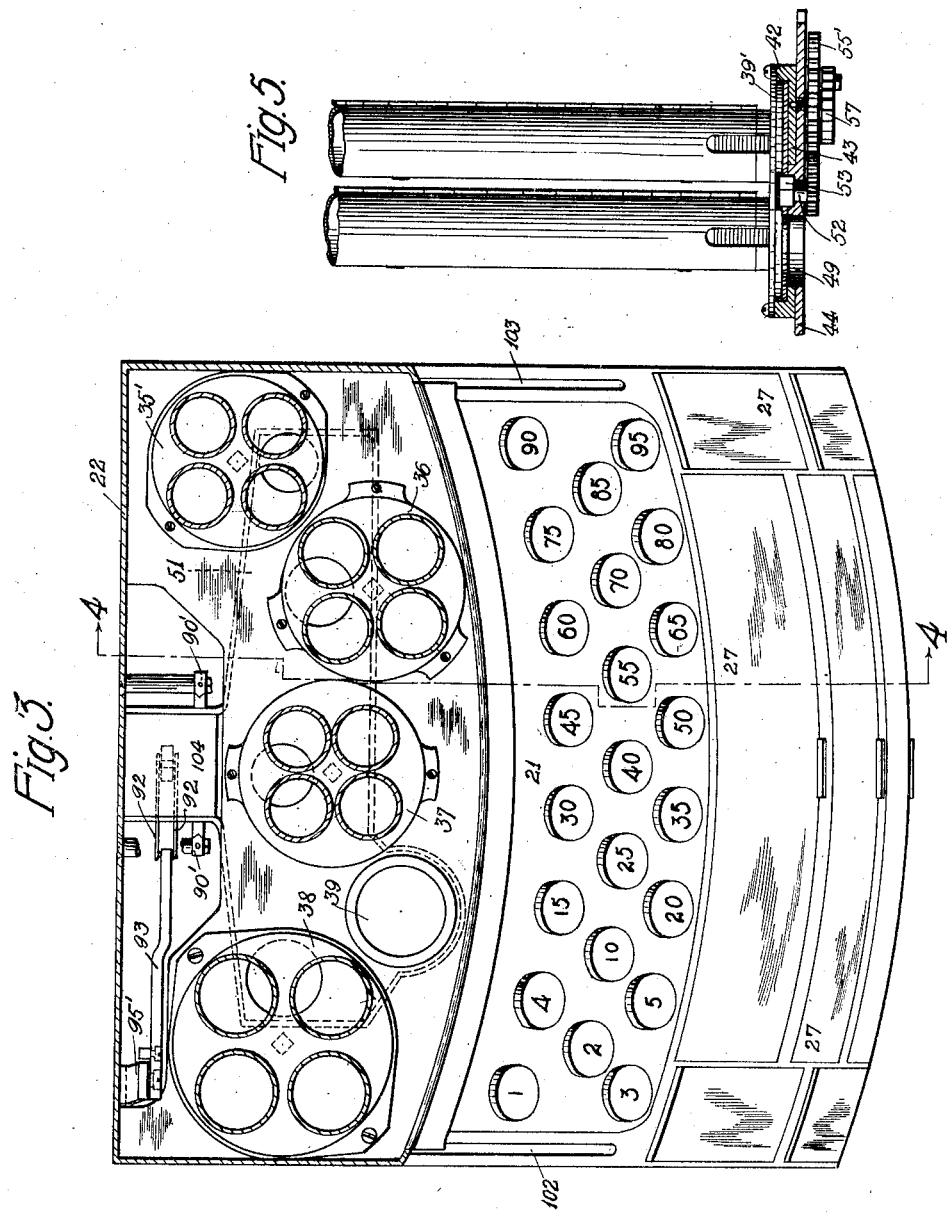

J. GARAMI.
COIN CHANGING AND DELIVERING MACHINE.
APPLICATION FILED MAY 22, 1918.
1,350,148.
Patented Aug. 17, 1920.
9 SHEETS—SHEET 4.
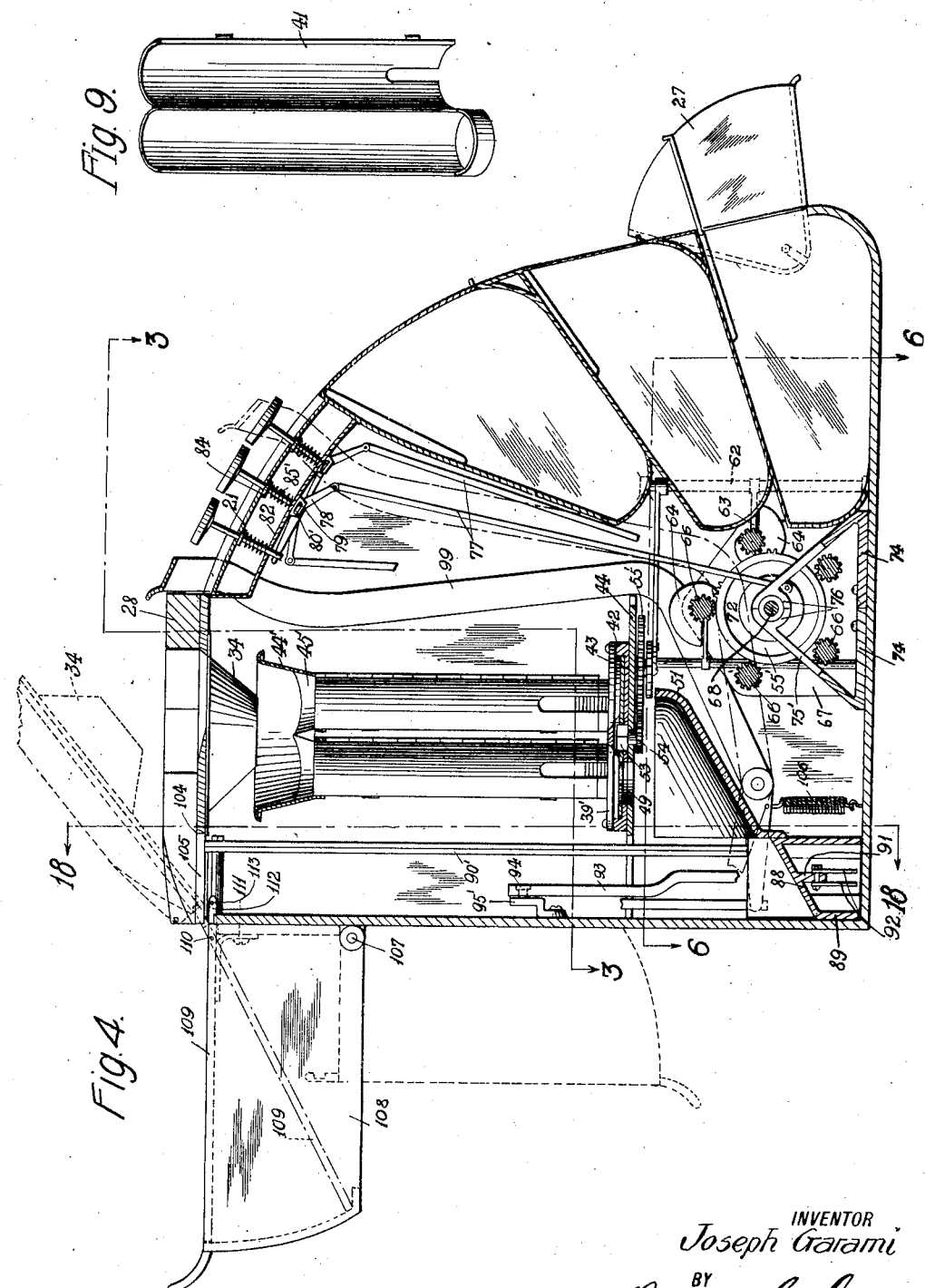
INVENTOR
Joseph Garami
BY
His ATTORNEY.

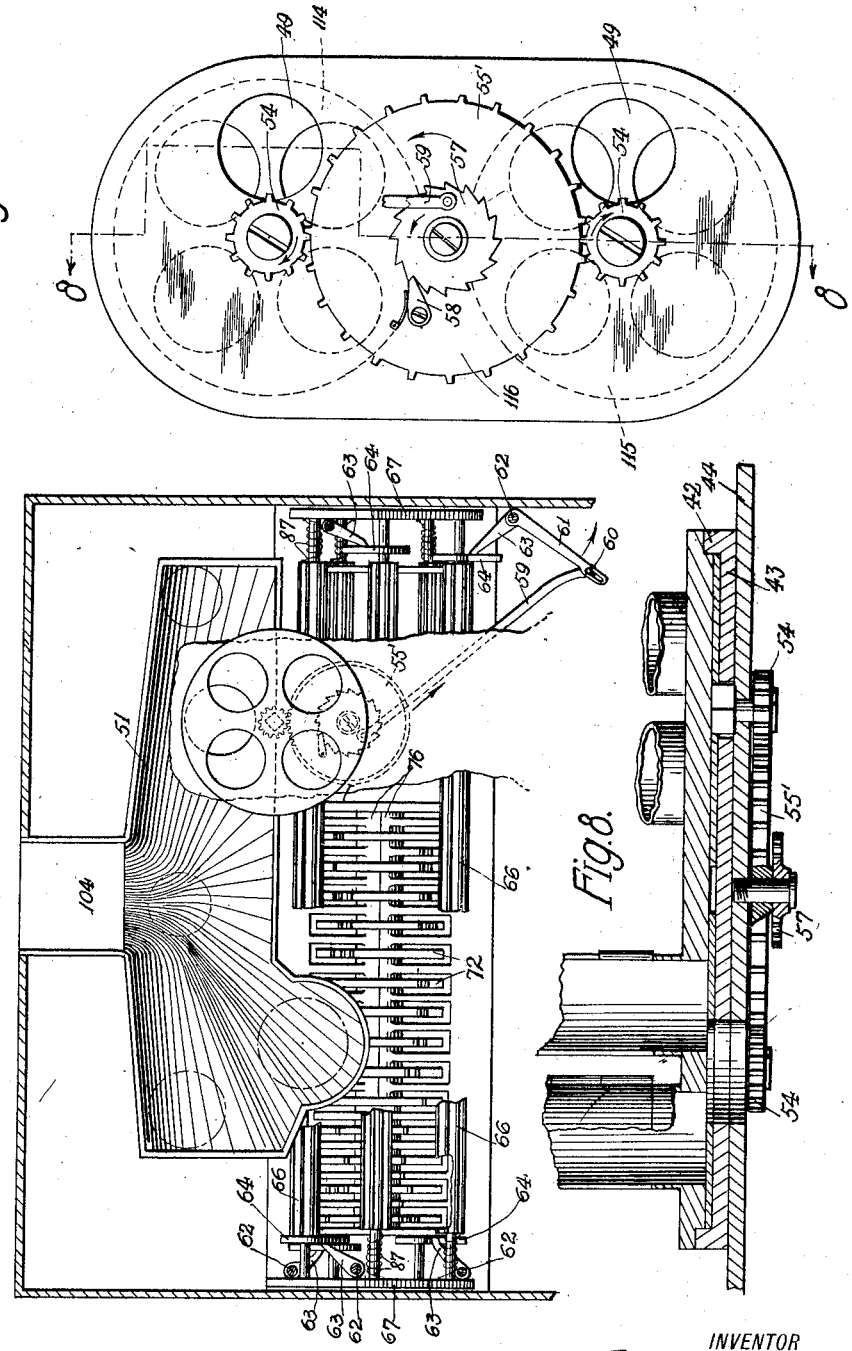

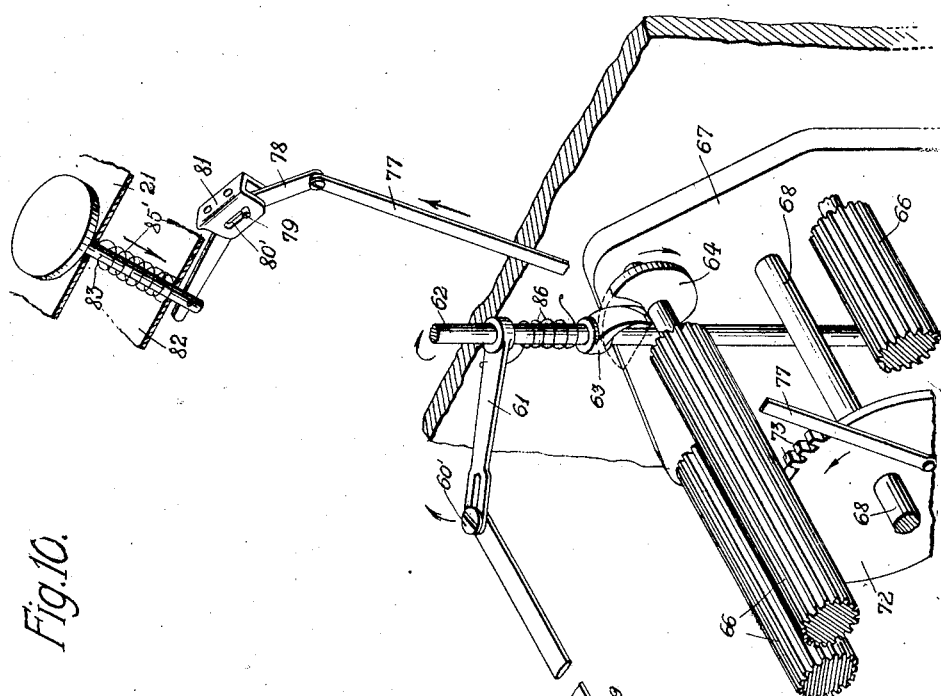
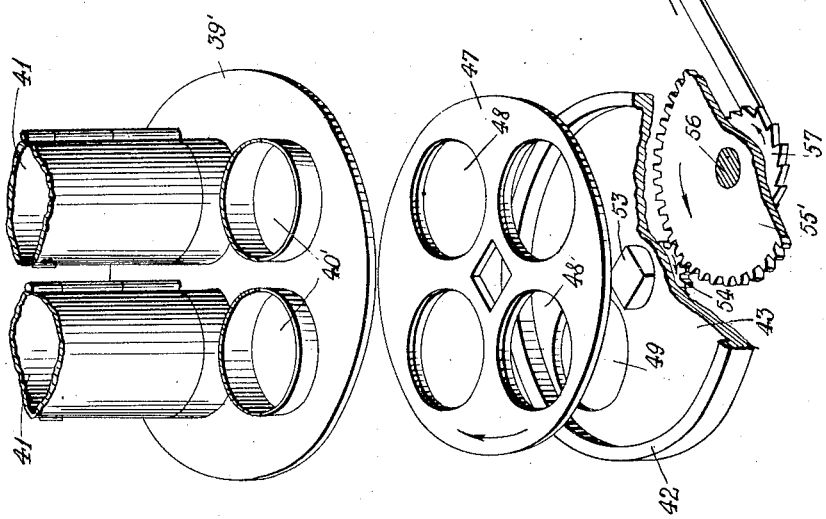

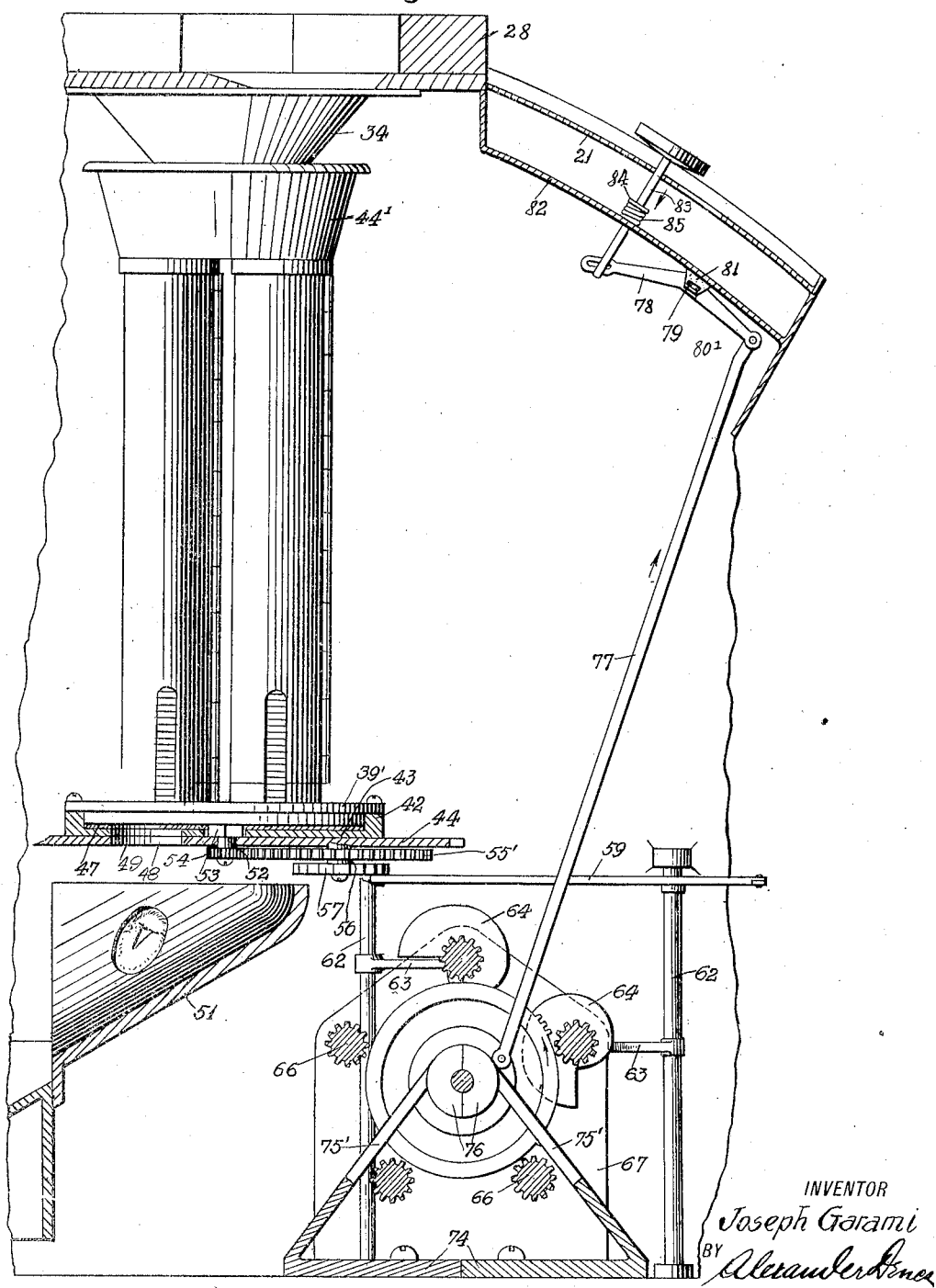

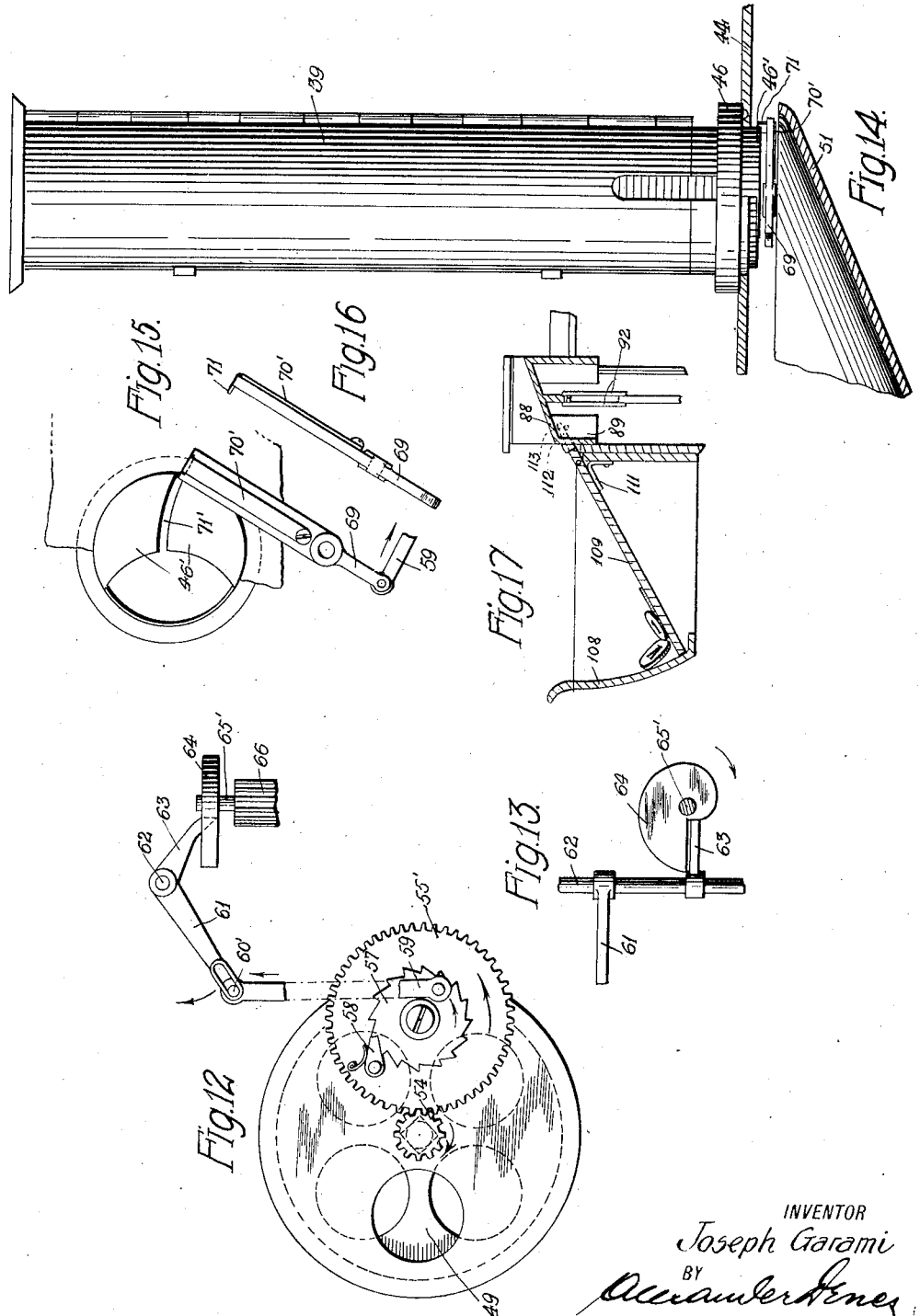

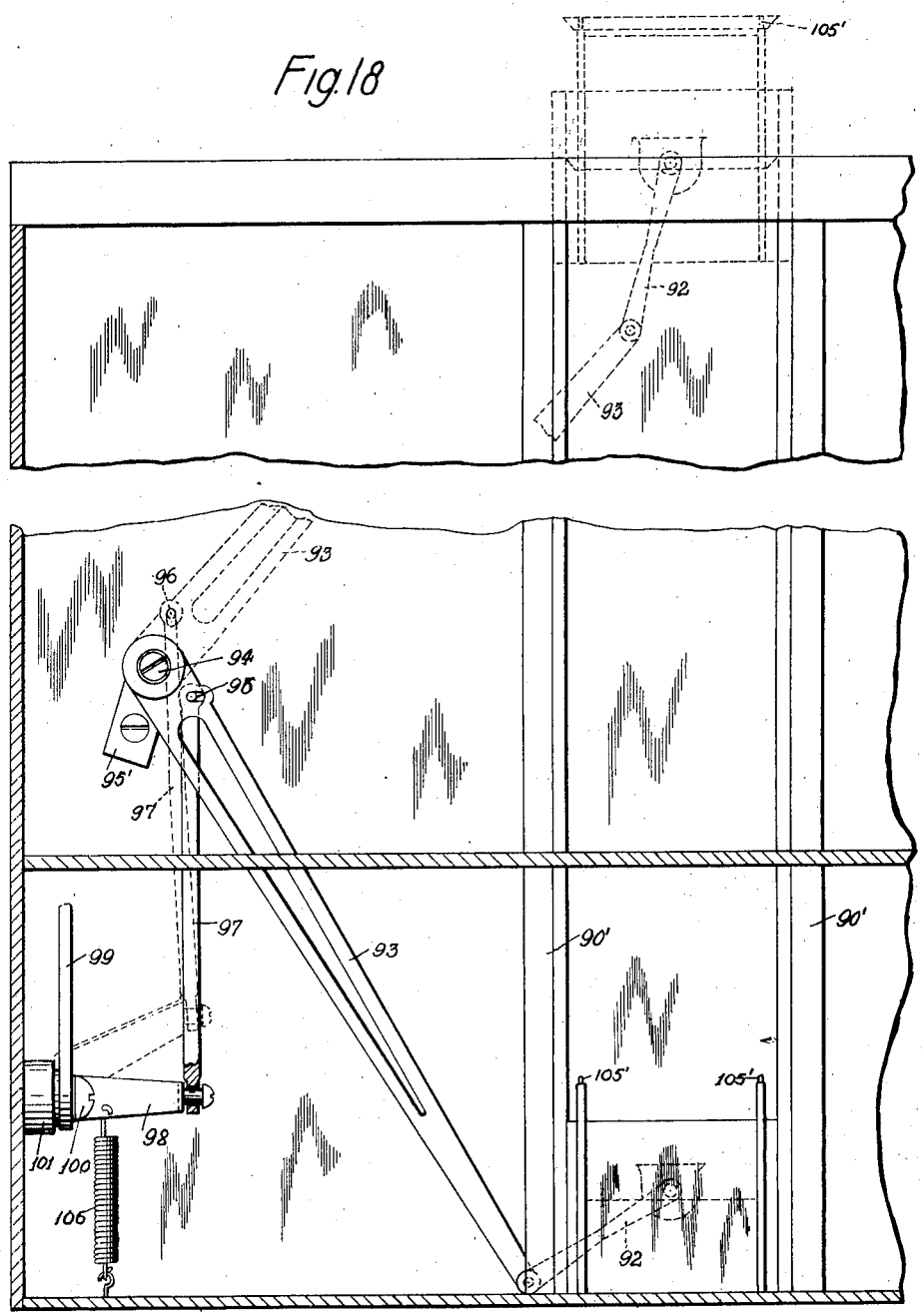

UNITED STATES PATENT OFFICE.

JOSEPH GARAMI, OF NEWARK, NEW JERSEY.

COIN CHANGING AND DELIVERING MACHINE.

1,350,148.　　　　　Specification of Letters Patent.　　Patented Aug. 17, 1920.

Application filed May 22, 1918. Serial No. 236,045.

*To all whom it may concern:*

Be it known that I, JOSEPH GARAMI, a subject of the King of Hungary, residing at Newark, in the county of Essex and State of New Jersey, have invented new and useful Improvements in Coin-Changing and Delivering Machines, of which the following is a specification.

This invention relates to coin changing and delivering devices, and a principal object of the invention is the provision of a coin-changing and delivering machine having parts so constructed and arranged that the usual small change coins as pennies, nickels, dimes and quarters, may be arranged in grouped stacks, either in single or double groups, with novel apparatus or mechanism for separating and delivering one or more coins from one group or one or more coins from one or more groups, accordingly as the changing transaction in hand requires.

Another object of the invention is the provision in a machine of this character of a key-board having press keys, on which are listed in progression the penny numbers from 1 to 4 and the change numbers from 5 to 95, the latter increasing by fives, and which control mechanism so arranged and coördinated that the exact change indicated on the face of any key may be separated and discharged by actuating the key in the usual way.

Another object of the invention is the provision of a machine of this character including a change delivering apparatus or mechanism which is adapted to deliver the change in a plane lying approximately level with the top of the machine, so that the machine may be secured to the ledge or support of the cashier's window and the change there discharged within the grasp of the party to whom it belongs, provision also being made in the machine for the accommodation of bills, checks, memoranda, and the like, as well as a reserve supply of small change.

A further object of the invention is the provision of a machine of this character having the coin-holding receptacles arranged in such manner that they may be filled from the outside when the cover is locked against opening, but which when the cover is unlocked and opened, are readily accessible for the removal of the coins therein contained at the end of the day or at any other period as desired by the party in charge.

A further object of the invention is the provision of a machine of this character which is compact and simple in construction, comparatively inexpensive to manufacture, accurate in operation, and which may be manipulated quickly and without delay or confusion in order to accommodate the public, particularly where long lines of customers are waiting, as frequently occurs in public places where tickets are sold.

With these objects in view and others, the invention resides in the details of construction and in the arrangement and combination of parts hereinafter described, defined in the claims, and illustrated in the accompanying drawings forming a part of this specification; it being understood that changes and alterations may be made in the precise embodiment of the invention herein disclosed, to which changes and alterations the inventor is entitled, provided the same are effected within the scope of the accompanying claims.

In the accompanying drawings;—Figure 1 is a view in perspective of my improved machine, showing the same attached to the cashier's window ledge.

Fig. 2 is a top plan view of the same.

Fig. 3 is a top view, showing parts in sectional plan in the direction of the line 3—3 of Fig. 4.

Fig. 4 is a vertical cross sectional view, taken in the direction of the line 4—4 of Fig. 3.

Fig. 5 is an elevational view of a group of coin-holding tubes, showing also the means associated therewith for controlling the discharge of the coins, parts being shown in section.

Fig. 6 is a fragmental sectional view, partly diagrammatic in character, taken approximately in the direction of the line 6—6 of Fig. 4.

Fig. 7 is an underneath plan view, showing how, under the modification to be hereinafter more fully described, two groups of coin-holding tubes of the same denomination may be arranged for the separation of coins therefrom alternately.

Fig. 8 is a sectional view, taken approximately in the direction of the line 8—8 of Fig. 7.

Fig. 9 is a detail view, illustrating how the coin-holding tubes open longitudinally.

Fig. 10 is a perspective view with parts broken away, showing the operating parts detached, but in proper relative position.

Fig. 11 is an enlarged fragmental sectional view, showing a press key depressed to effect the discharge of coins, here shown as being discharged from the group of coin-holding tubes of the five cent denomination.

Figs. 12 and 13 are detail views showing the cam actuated mechanism which controls the discharge of the coins.

Fig. 14 is an enlarged view, showing the preferred tube for holding the half-dollar coins.

Figs. 15 and 16 are detail views, showing the arrangement of parts for controlling the discharge of the half-dollar coins.

Fig. 17 is a sectional detail view, showing the coin delivery elevator in raised position, and showing also the swinging plate actuated thereby for receiving the delivered coins.

Fig. 18 is an enlarged fragmental view, taken in transverse section in the direction of the line 18—18 of Fig. 4, showing in particular the coin-delivery elevator and the mechanism for operating the same.

With more particular reference to the accompanying drawings, the numeral 19 denotes a metallic casing, which, behind the forwardly and downwardly curved key panel 21, is made with an open top end 22, designed to be fitted snugly in an opening 23, suitably provided in the ledge 24 on the inner side of the cashier's window, side brackets as 25 or other suitable means being employed to connect the casing rigidly with the underside of the said ledge. This casing is also made with a flat bottom 26, under which an additional ledge or table-support may be provided, if desired; and which, when the machine is not used in connection with the cashier's window as shown, enables it to be placed upon a table, desk or other support for convenient use. In the front of the casing below the key panel 21, there are provided drawers 27, as convenient receptacles for paper money, checks, memoranda and a reserve supply of coins.

Hinged to the back of the casing so as to fit snugly upon and close the open top 22, is a cover plate 28, which may be locked closed upon the casing by any suitable locking mechanism. Through this cover plate are provided, approximately in circular order, the spaced openings 29, 30', 31, 32 and 33, through which may be passed, respectively, the supply of coins of different denominations as one, five, ten, twenty-five, and fifty cent pieces. To the underside of this cover plate, there is secured for each opening, a funnel-shaped coin guide 34 to direct the coins into their respective coin-holding receptacles, which consist, in the present embodiment of the invention, of four groups of tubular holders 35', 36, 37 and 38, the holders of each group being of the proper diameter to receive snugly that denomination of coins which is passed through the opening immediately thereabove, the coins as they fall into their respective tubes accumulating in stacks in an obvious manner. To save space and to enable the production of a machine of as small dimensions as possible, consistent with its purpose, I provide but one tube 39 for holding the half-dollar coins.

Of the groups, each consists preferably of four tubes, the lower ends of which are soldered or otherwise secured upon a circular plate 39' having circular openings 40' of the same diameter as the tubes. Just above its lower end each tube is preferably made with a longitudinally hinged half 41, which may be opened outwardly from the group so that at the end of the business day the undischarged coins may be readily removed. Each plate 39' is secured upon the upwardly projecting rim 42 of another plate 43, the latter being secured in position upon a platform or ledge 44, which is arranged in the casing spaced a distance above the bottom thereof in order to accommodate the working parts to be presently described.

Surrounding the top ends of each group of tubes and secured thereto is a funnel-shaped part 44' which is sub-divided into four channels as 45', by which the coins, upon passing through the top funnel part 34, are diverted into the tubes composing the group. Groups consisting each of four coin-holding tubes are thus provided for each of the coin denominations under the half-dollar piece in order that, as will later appear, more than one coin of the same denomination may be discharged during one operation, and also in order that the supply of small coins of the five, ten and twenty-five cent denominations, will not have to be replenished so frequently. The half-dollar coin tube 39 is longer than the tubes of the other groups, terminating immediately beneath the first funnel part 34 so as to receive the coins directly therefrom. As shown in Figs. 14 and 15, the coin discharging arrangement at the lower end of the half-dollar tube preferably differs from that employed for the grouped tubes. Upon this tube is provided a collar 46 which is secured directly to the ledge 44, the tube itself extending below said ledge where it is formed with a partial closure 46', which, although of sufficient extent to support the coins, permits them to be ejected laterally therefrom one by one.

Rotatably seated in each fixed disk plate 43 of the grouped tubes, is a coin-discharging disk 47, which is provided therethrough with openings 48 one for each tube. In thickness, each disk corresponds substantially with the original thickness of the denomination of coins for which it is designed to discharge; and around the openings 48, each is preferably beveled downwardly a trifle to allow for the diminution of the worn coins. Through the fixed disk 43 is provided a coin-discharging opening 49 to match the said openings 48, so that the coins which fall into the latter, by reason of the same having been brought into register with the openings 40' of the plate 39', may, under an obvious rotation of the disk 47, drop through the said opening 49 and thence onto a rearwardly inclined tray 51, which is of such extent (Fig. 3) that it may receive the coins discharged from all the groups as well as from the half-dollar tube.

Projecting through a suitable central opening in each fixed disk 43 is a spindle 52 formed with a square head 53 which engages a corresponding opening provided centrally in the rotatable disk 47. Fast on the spindle underneath the fixed disk 43 is a small gear 54 in mesh with a large gear 55', loosely mounted upon a vertical stud 56, which projects downwardly from the platform or ledge 44. Fast upon this spindle underneath the said loose gear 55' is a ratchet wheel 57, with the teeth of which is adapted to engage the spring-pressed pawl 58 pivoted to the underneath side of the said loose gear 55'. Pivoted to the underneath side of the ratchet wheel is the end of a connecting rod 59, the opposite end of which is provided with a screw 60' working in a slot in the end of the lever 61, the latter being secured at its opposite end upon a vertical shaft 62, which is rotatably secured in fixed parts suitably provided on the inner side of the casing; there being obviously a similar arrangement of parts for each group of tubular coin-holders. Secured upon each shaft below the link 61 is a pressure arm 63 projecting so that its end engages the periphery of a cam 64, secured upon the end of the spindle 65' of the horizontal pinion or pin-wheel 66. There are five of these pinions 66—one for each group of holders including, of course, the half-dollar holder. These pinions extend horizontally across the casing in the lower part thereof behind the drawers, the opposite ends of their spindles being suitably journaled in plates or standards 67 secured to the inner sides of the casing. These pinions are arranged in circular order, as best seen in Fig. 4, spaced around a central shaft 68, the ends of which are also secured in the said standards 67.

As a means of ejecting the half-dollar coins, I pivotally connect the rod 59 with the end of the lever 69 (Fig. 15) pivoted intermediate its length, and to which is pinned a spring 70' having its end 71 bent over to extend through a slot 71' in the partial end closure 46', so as to be capable of engaging and ejecting the lowermost coin under each outward movement; the spring under the weight of the coin or coins thereabove, is designed to yield downwardly during the return movement of the lever, and in order to permit and effect such yielding, the rearward edge of the spring end 71 is beveled.

Loosely mounted upon the central shaft 68 are a number of wheels 72 provided each with one or more sets of teeth as 73 varying in number, which teeth are adapted to mesh with their respective pinions, for differential purposes, as will presently appear.

In order to operatively maintain these segmentally toothed wheels 72 in spaced-apart position, there are provided two complementary standards 74 (Fig. 4), made as integral pieces, and extending the entire length of the pinions 66. These standards are formed with flat bases, which are secured to the inner side of the bottom of the casing, and with spaced inclined side arms 75' terminating each in a half bearing or collar 76, which fits upon the shaft 68 (Figs. 4 and 6) sufficiently close to the wheels 72 to hold them in position, yet allowing them to have free rotary movement.

Upon the face of each wheel 72 is pivoted a connecting bar 77 which extends upwardly in the casing (Figs. 4 and 11), and is pivotally connected to an angular lever 78 of bell-crank formation. Each lever 78 has a horizontal pin 79 engaged in a slot 80' provided in the hanger 81 carried upon the underside of a plate 82, the latter being secured rigidly to the casing spacedly below the key-panel 21. To the opposite end of each lever 78, there is pivoted the end of the key or button stem 83, which slidably extends through said plate 82 and the said key-panel 21. To hold each key stem normally in extended position, it is provided below the key-panel 21 with a collar 84 with which is engaged a spring 85', the lower end of which is fast with the said plate 82. Each stem carries the usual press key or button, bearing a number indicative of the coin or coins it represents. Thus, in the present embodiment of the invention, keys from one to four, inclusively, represent penny denominations, while the keys progressing by fives, from five to ninety-five, represent coins or combinations of coins of the usual denominations of five, ten, twenty-five, and fifty-cent pieces; the principle involved being that upon the manipulation of a key, the exact change indicated thereon will be produced by the machine.

Now, we have seen that there is a wheel as 72 for each key and that there is a pinion as 66 for each group of coin holders including the half-dollar coin holder. It will be understood, also, that there is a cam 64 arranged on the spindle of each pinion. Each cam is so formed that it is adapted to produce, through the controlled mechanism, a quarter-turn, a half-turn, a three-quarter turn, or a whole turn of the rotatable coin delivering disk 47, in order that from any one group of holders, one or more coins may be discharged under a single operation or depression of the controlling key. It will be noted that a spring 86 serves to return each shaft 62 after each movement in order to hold the arm 63 in proper engagement with its cam; and also that another spring 87 (Fig. 6) serves to return each pinion and consequently its actuated gear after each movement.

The teeth 73 on the wheels 72 vary in number as may be necessary in order to effect a quarter-turn, half-turn, three-quarter turn, or whole turn, of any particular pinion. For instance, the gears 72 controlled by keys as 1, 5, 10, 25 and 50, have only the teeth necessary to effect a quarter-turn of the coin discharging disk 47, inasmuch as but one coin is desired in each case, whereas, the teeth on the gears controlled by the keys as 2, 20, and others, accordingly as the machine is set, are of sufficient number to effect a half-turn of the disk 47, to cause the discharge of two coins at one operation. Again, the wheel controlled by key 3 has teeth in sufficient number to effect a three-quarter turn of the disk, while that controlled by the key 4 effects a whole turn of the disk to cause in an obvious manner the discharge of three and four coins, respectively, in one operation. These wheels 72, moreover, may not only have their teeth 73 vary in number, as described, but may also have more than one set of teeth in order to effect the actuation of more than one pinion during one operation in such manner that one coin or more than one coin of two or more denominations may be discharged at one operation. For instance, the wheel controlled by the button 15 has two sets of teeth, one set to actuate the pinion for the discharge of a ten cent coin and the other to actuate another pinion for the discharge of a five cent coin. For instance, again, the wheel controlled by the button 40 is equipped with three sets of teeth; one set to actuate the pinion controlling the discharge of a twenty-five cent piece, another to actuate the proper pinion for the discharge of a ten cent piece and still another to actuate the proper pinion for the discharge of a five cent piece. These instances are only cited as illustrations of how the teeth of the wheels 72 may differ in number and in sets in order that the exact change in agreement with the number on the key may be produced; and it will be understood that any number of combinations or re-combinations may thus be effected apart from the combinations described and embodied in the present disclosure.

As hereinbefore described, an inclined tray 51 receives the coins as discharged, which tray because of its form and inclination, directs them onto the inclined bottom 88 of a vertically movable carrier or elevator 89, which is mounted to slide upon oppositely disposed vertical guides 90' arranged in the rear of the casing centrally thereof. Projecting downwardly and centrally from the bottom 88 of said elevator is an integral lug 91 with which is pivotally engaged the extremities of a pair of arms 92. The opposite ends of the said arms 92 are pivotally engaged with the lever 93, having its opposite end pivoted on a stud 94, which projects from an angular bracket 95' rigidly secured to the inner back of the casing. Pivoted to the lever 93 at 96, near the top edge thereof in front of the stud 94, so as to give the said lever 93 an extensive swing, is a link 97, the lower end of which is pivotally engaged with the angular short arm 98 of the bell-crank-lever 99, which is fulcrumed on a pin 100, projecting from the block 101 secured to the side of the casing. The long arm of the bell-crank-lever 99 extends forwardly along the casing, and is bent upwardly and curved so as to extend through an opening 102 provided along the side of the key panel 21, above which it is bent to lie in curved horizontal position above the keys, the opposite end thereof being again similarly bent to enter a similar slot 103 on the other side of the key panel, below which slot the incurved end is pivoted to the casing in any suitable manner. This whole arrangement is such that the horizontally extending portion of this lever may be drawn forwardly over the keys or buttons in an obvious manner, which operation through the connected levers raises the elevator 89 until it projects through an opening 104, provided in the top of the cover plate 28, with the rear end of the backwardly inclined bottom 88 lying just above the top of the cover for the discharge of the coins.

Loosely seated in the opening 104 is a cover 105, into which, when the elevator 89 rises, projects the pins 105', upstanding from the elevator sides, so that the cover is carried upwardly with the elevator, closing the top of the same. When the elevator is again drawn within the casing, this cover plate 105 is reëngaged in its seat, it being noted in this connection that a spring 106, which connects the arm 98 with the bottom of the casing, serves to withdraw the elevator after each operation and to reposition the various parts.

As best shown in Figs. 4 and 17, there is hinged at 107 upon the back of the casing below the top thereof, a receptacle 108 which may be secured in horizontal position with its top plate 109 lying just below the backwardly beveled bottom 89 of the elevator when in raised position. This top plate 109 is pivotally engaged at 110 with the receptable and is of such size as to swing thereinto, a spring 111 serving to keep it normally in horizontal position. With this plate is connected a projection 112 which is adapted to be engaged by a pin 113 carried by the elevator in such manner that when the elevator is moved into raised position, the said plate 109 will be swung into the receptacle so that any coins carried by the elevator may slide onto said plate, which, by the action of the spring 111, when the elevator is withdrawn, is returned to vertical position with the money thereon, so that the same can be readily grasped by the party to whom the change belongs.

In Figs. 7 and 8, I illustrate a modified form of my invention which may be utilized in machines of a larger size in which it is desired to keep a large supply of coins ready for delivery. Here, instead of showing one group of coin-holding tubes for a particular denomination of coins, I show two groups 114 and 115 for the same denomination. In order to discharge the coins alternately from each group, I employ a large gear wheel 116 instead of the gear wheel 55′, the same being arranged between, and to mesh with, the small gear 54 of each group, the arrangement of teeth on the large gear 116 being such that the small gears are actuated alternately under successive operations.

Having thus described my invention, what I claim is:—

1. A machine of the class described including a casing, groups of coin-holding tubes therein disposed, two of the groups being associated to constitute a double group, each group comprising four tubes arranged about a common center, a coin-discharging disk operatively arranged under each group and adapted to separate coins one by one from the members thereof successively and operable only in one direction, and key-operated mechanism for actuating one or more of said coin-discharging disks to effect the separation of coins from one or more groups at each operation, said mechanism embodying means for separating coins alternately from the members of the double group.

2. A machine of the class described including a single and a double group of coin-holding tubes for denominations of coins below half-dollar pieces, a coin-holder for half-dollar pieces, independent coin-discharging means associated with each of said groups for separating coins from the members thereof successively, means associated with the half-dollar holder for separating coins therefrom one by one, and key-operated mechanism for actuating said coin-discharging means for said single and double groups as well as said coin-discharging means for the half-dollar holder to effect the discharge of one or both of said coins from one or more groups at each operation simultaneously with the discharge of a half-dollar piece.

3. A machine of the class described including single and double groups of coin-holding tubes for denominations of coins below half-dollar pieces, a coin-holder for the half-dollar pieces, coin-discharging means associated with each group for separating coins from the members thereof successively, means associated with the half-dollar tube for separating coins therefrom one by one, key operated mechanism for actuating said coin-discharging means for the groups as well as said coin-discharging means for the half-dollar tube to effect the discharge of one or more coins from one or more groups with the discharge of a half-dollar piece at one operation, and means for delivering the discharged coins exteriorly of the casing.

4. In a machine of the class described, the combination with grouped coin-holding tubes, each group being adapted to hold coins of different denominations, an apertured coin-discharging plate below each group and having a coin discharging disk rotatively arranged therein, each disk being provided with openings adapted to register in succession with the tubes of the group to effect the discharge of coins one by one from the members thereof, said openings being registrable also with the aperture in the coin-discharging plate, a pinion for each disk, means operated by each pinion to effect differentially the rotation of its respective disk in one direction only for the discharge of one or more coins from each group, the number of coins discharged from each group depending upon the extent of rotation of said pinions, and mechanism for differentially actuating one or more of the pinions and comprising a plurality of press-keys, a shaft from which each pinion is equally spaced, segmental gears on the shaft corresponding to the press-keys and adapted to engage one or more of the pinions.

5. In a machine of the class described, the combination with groups of coin-holding tubes adapted each group to hold coins of the different denominations, one or more of said groups being double groups adapted to hold coins of the same denomination, independent coin discharging means associated with each group for effecting the discharge of coins from the members thereof in succession, and key operated mechanism for variably operating one or more of the coin-discharging means at each operation, said key-operated mechanism including means for operating the coin-discharging means of double groups alternately.

6. In a machine of the class described, two groups of coin-holding tubes, a coin-discharging plate disposed below each group, a coin-discharging disk rotatably disposed in each plate and provided with a coin opening for each member of the group to separate coins therefrom successively, gearing including a main gear for operating said disks alternately, a pinion, a cam carried by the pinion, means arranged to be operated by said cam and connected with said main gear whereby to rotate said disks in constant directions to bring the openings thereof past one or more of the members of the group at each operation, and means for actuating said pinion differentially.

7. In a machine of the class described, the combination of coin-holding tubes comprising a single tube, a group of tubes and a double group of tubes, independently operated coin-discharging mechanisms corresponding to the single tube, the group of tubes and the double group of tubes, and key-operated means for variably actuating said several coin-discharging mechanisms to effect the discharge of one or more coins from the single tube, the group of tubes and the double group of tubes.

In testimony whereof I have signed my name to this specification.

JOSEPH GARAMI.